(12) United States Patent
Chen et al.

(10) Patent No.: US 9,459,809 B1
(45) Date of Patent: Oct. 4, 2016

(54) OPTIMIZING DATA LOCATION IN DATA STORAGE ARRAYS

(71) Applicant: EMC Corporation, Hopkinton, MA (US)

(72) Inventors: Xiangping Chen, Sherborn, MA (US); Miles A. de Forest, Bahama, NC (US); Dennis T. Duprey, Raleigh, NC (US); Karl M. Owen, Chapel Hill, NC (US); Jean-Pierre Bono, Westborough, MA (US); Walter A. O'Brien, III, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 207 days.

(21) Appl. No.: 14/319,566

(22) Filed: Jun. 30, 2014

(51) Int. Cl.
G06F 11/00 (2006.01)
G06F 3/06 (2006.01)
G06F 11/14 (2006.01)

(52) U.S. Cl.
CPC ............. G06F 3/0644 (2013.01); G06F 3/065 (2013.01); G06F 3/0617 (2013.01); G06F 3/0683 (2013.01); G06F 11/1469 (2013.01)

(58) Field of Classification Search
USPC ......................................................... 714/6.23
See application file for complete search history.

(56) References Cited

U.S. PATENT DOCUMENTS

| | | | | |
|---|---|---|---|---|
| 8,380,928 B1* | 2/2013 | Chen | ...................... | G06F 3/061 711/117 |
| 8,429,346 B1* | 4/2013 | Chen | ...................... | G06F 3/0689 709/213 |
| 8,473,678 B1* | 6/2013 | Rajasekaran | ......... | G06F 3/0605 711/114 |
| 8,645,662 B2* | 2/2014 | Burton | .................. | G06F 3/0611 711/114 |
| 8,909,829 B1* | 12/2014 | Thangapalam | ....... | G06F 3/0604 710/18 |
| 8,949,255 B1* | 2/2015 | Faibish | .................. | G06F 17/301 707/755 |
| 8,984,027 B1* | 3/2015 | Patwardhan | ...... | G06F 17/30079 707/809 |
| 9,223,792 B1* | 12/2015 | Stacey | ................ | G06F 17/3012 |
| 9,229,656 B1* | 1/2016 | Contreras | ............... | G06F 3/067 |
| 9,256,381 B1* | 2/2016 | Fultz | ...................... | G06F 3/0611 |
| 9,275,063 B1* | 3/2016 | Natanzon | .......... | G06F 17/30132 |
| 9,323,682 B1* | 4/2016 | Marshak | ............. | G06F 12/0866 |
| 9,348,761 B1* | 5/2016 | Cummins | ........... | G06F 12/1018 |
| 2007/0022314 A1* | 1/2007 | Erasani | ............... | G06F 11/1425 714/4.1 |
| 2012/0072670 A1* | 3/2012 | Jess | ...................... | G06F 12/0868 711/136 |
| 2013/0145095 A1* | 6/2013 | McKean | ............. | G06F 17/3048 711/122 |
| 2014/0032959 A1* | 1/2014 | Dawkins | ............. | G06F 11/2048 714/6.3 |
| 2014/0258659 A1* | 9/2014 | Petersen | ................. | G06F 3/065 711/162 |
| 2014/0351515 A1* | 11/2014 | Chiu | ...................... | G06F 3/0605 711/117 |
| 2015/0277773 A1* | 10/2015 | Shen | ...................... | G06F 3/0607 711/114 |
| 2015/0355947 A1* | 12/2015 | Polkovnikov | ......... | G06F 3/0631 718/104 |

* cited by examiner

*Primary Examiner* — Amine Riad
(74) *Attorney, Agent, or Firm* — Krishnendu Gupta; Jason A. Reyes; John T. Hurley

(57) ABSTRACT

A technique is used for optimizing data location in data storage arrays. A primary storage array is associated with a secondary storage array, the primary storage array and secondary storage array including auto-tiering functionality, where the secondary storage array is configured as a backup storage array for the primary storage array. Tiering metadata is derived for a storage object stored on the primary storage array. The tiering metadata is transmitted to the secondary storage array. Auto-tiering is initiated at the secondary storage array, where the received tiering metadata is provided as input to the secondary storage array's auto-tiering function when auto-tiering replicated storage object associated with the tiering metadata.

18 Claims, 10 Drawing Sheets

OPTIMIZING DATA LOCATION IN DATA STORAGE ARRAYS

BACKGROUND

1. Technical Field

This application relates generally to optimizing data location in data storage arrays.

2. Description of Related Art

A traditional storage array (herein also referred to as a "data storage system," "disk storage array," "disk array" or simply "array") is a collection of hard disk drives operating together logically as a unified storage device. Storage arrays are designed to store large quantities of data. Storage arrays typically include one or more storage array processors (SPs), for handling requests for allocation and input/output (I/O) requests. An SP is the controller for and primary interface to the storage array.

A storage array may be thought of as a system for managing a large amount of a resource, i.e., a large number of disk drives. Management of the resource may include allocation of a portion of the resource in response to allocation requests. In the storage array example, portions of the storage array may be allocated to, i.e., exclusively used by, entities that request such allocation.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

Large storage arrays today manage many disks that are not identical. Storage arrays use different types of disks and group the like kinds of disks into tiers based on the performance characteristics of the disks. A group of fast but small disks may be a fast tier (also referred to as "higher tier" or "high tier"). A group of slow but large disks may be a slow tier (also referred to as "lower tier" or "low tier"). It may be possible to have different tiers with different properties or constructed from a mix of different types of physical disks to achieve a performance or price goal. Storing often referenced, or hot, data on the fast tier and less often referenced, or cold, data on the slow tier may create a more favorable customer cost profile than storing all data on a single kind of disk.

A storage tier may be made up of different types of disks, i.e., disks with different redundant array of inexpensive disks (RAID) levels, performance and cost characteristics. In the industry there have become defined several levels of RAID systems. RAID (Redundant Array of Independent or Inexpensive Disks) parity schemes may be utilized to provide error detection during the transfer and retrieval of data across a storage system.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. For example, a traditional storage array may include a collection of hard disk drives operating together logically as a unified storage device. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

SUMMARY OF THE INVENTION

A technique is used for optimizing data location in data storage arrays. A primary storage array is associated with a secondary storage array, the primary storage array and secondary storage array including auto-tiering functionality, where the secondary storage array is configured as a backup/disaster recovery storage array for the primary storage array. Tiering metadata is derived for a storage object stored on the primary storage array. The tiering metadata is transmitted to the secondary storage array. Auto-tiering is initiated at the secondary storage array, where the received tiering metadata is provided as input to the secondary storage array's auto-tiering function when auto-tiering replicated storage object associated with the tiering metadata.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
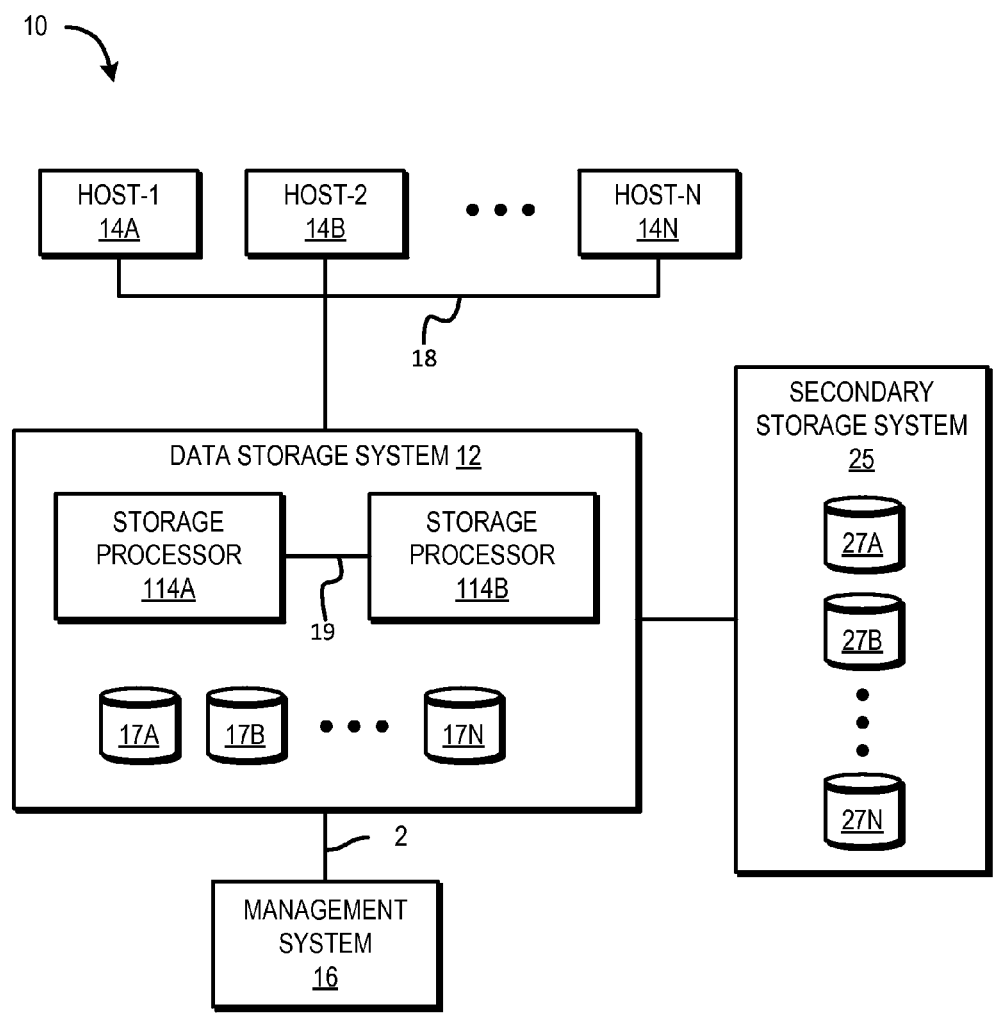
FIG. 1 is an example embodiment of a system that may utilize the techniques described herein.

Generally, a storage pool is a collection of storage that is provisioned for a logical unit. A storage pool may be a collection of disks, which may include disks of different types. Storage pools may further be subdivided into slices; for example a 1 gigabyte (GB) slice may be the allocation element for a logical unit. Further, a slice may be 256 megabytes (MB) in size. A pool may include a set of storage tiers. Further, both a storage tier and a pool may have storage devices of different performance capabilities and costs. A slice may be considered the smallest element that can be tracked and moved. It may be advantageous to store the hot or most accessed data on the devices within the storage pool with the best performance characteristics while storing the cold or least accessed data on the devices that have slower performance characteristics. This can lead to a lower cost system having both faster and slower devices that can emulate the performance of a more expensive system having only faster storage devices.

A storage tier or a storage pool may be a collection of storage containers. A storage container may be a unit of storage including a set of storage extents. A storage extent is a logical contiguous area of storage reserved for a user requesting the storage space. For example, a storage tier may include three storage containers, each storage container including a set of disks and the set of disk in each storage container having different RAID levels.

A disk may be a physical disk within the storage system. A LUN may be a logical unit number which is an identifier for a Logical Unit. Each slice of data may have a mapping to the location of the physical drive where it starts and ends.

Generally, slices are allocated to storage objects in a storage pool as "best-fit" at initial allocation time. A storage object can be a LUN, File System, or any other customer provisioned, accessible, and manageable unit of storage. In at least some cases, since the I/O load pattern of a slice is not known at initial allocation time, the performance capability of storage allocated may be too high or too low for effective data access on a slice. Furthermore, a data access pattern tends to change over time. Older data is accessed less frequently and therefore in at least many cases does not require storage with higher performance capability. Temperature of each storage slice is an indication of hotness of a slice, in other words, frequency and recency of slice I/Os. Better overall system performance can be achieved by placing hot slices to higher tier and cold slices to lower tier.

Slice relocation (herein also referred to as a "data relocation" or "data migration") is a process of determining optimal or near optimal data location and placement among storage units (e.g., storage tier, RAID group) based on I/O load of the storage objects. Slice relocation helps provide a way to determine respective preferable or best storage locations of slices within a storage object in a storage pool, and to construct a slice relocation candidate list to move slices from their current locations to the respective preferable or best locations. Data migration, i.e., the moving of data from one storage element to another, may be performed at the storage object level or at the slice level. Data migration at the slice level may be performed by copying the data of a slice and then updating an address map of the slice with the new location of the slice. A slice may store data or metadata of the data. I/O operations performed for copying data of a slice in order to relocate the slice are referred to as relocation I/Os. Generally, in order to perform data migration for a storage object such as a slice, the slice is mirrored in such a way that two copies of the slices are maintained during relocation of the slice where a source copy refers to the original slice which is targeted for relocation and a destination copy refers to a destination slice to which data of the original slice is copied to. Thus, the slice relocation process requires storage space in a destination storage tier for relocating contents of source slices and requires swap storage space in a source storage tier for mirroring the source slices to destination slices.

Generally, an Auto-Tiering policy engine (PE) of a data storage system examines a storage pool's storage configuration and temperatures of all slices in that storage pool, and generates a slice relocation list. The slice relocation list identifies slices to be relocated with respective destination information. In general, slices in a storage pool are matched to the most appropriate respective tiers based on their respective temperatures (e.g., hot, cold) and tier preferences (e.g., High, Low, Optimal). If a slice's current tier differs from its matching tier, the slice is listed in the relocation candidate list. The PE is also referred to herein as the slice relocation process.

Further, a tiered storage pool may include storage with different performance characteristics such that a logical unit created from storage space provisioned from the storage pool may include slices from different storage tiers with different performance characteristics. An automated storage tiering process (also referred to herein simply as "slice relocation process") relocates slices among storage tiers in order to improve I/O performance, decrease system runtime cost and reduce disk drive wear. However, the process of slice relocation consumes system resources such as CPU, memory, cache space, and bandwidth of a backend storage device.

FIG. 1 depicts an example embodiment of a system that may be used in connection with performing the techniques described herein. The system 10 includes one or more data storage systems 12 connected to server or host systems 14a-14n and secondary storage system(s) 25 through communication medium 18. The system 10 also includes a management system 16 connected to one or more data storage systems 12 through communication medium 2. In this embodiment of the system 10, the management system 16, and the N servers or hosts 14a 14n may access the data storage systems 12 and/or secondary storage system 25, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12 and/or secondary storage system 25, and may also communicate with other components (not shown) that may be included in the system 10. In one embodiment, the communication medium 2 may be a LAN connection and the communication medium 18 may be an iSCSI, Fibre Channel, Serial Attached SCSI, or Fibre Channel over Ethernet connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application. In alternative example embodiments, the secondary storage system 25 may be connected directly to the hosts 14a-14n or other hosts (not shown).

It should be noted that the particular examples of the hardware and software that may be included in the data storage systems 12, 25 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12 and/or the secondary storage system 25.

The management system 16 may be used in connection with management of the data storage systems 12, 25. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12, 25 may include one or more data storage systems such as one or more of the data storage systems, such as data storage arrays, offered by EMC Corporation of Hopkinton, Mass. Each of the data storage systems may include one or more data storage devices 17A-17N, 27A-27N. Unless noted otherwise, data storage devices may be used interchangeably herein to refer to hard disk drive, solid state drives, and/or other known storage devices. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12, 25. It should be noted that each of the data storage systems may operate stand-alone, or may also be included as part of a storage area network (SAN) that includes, for example, other components such as other data storage systems. Each of the data storage systems may include a plurality of storage devices 17A-17N, 27A-27N. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein. The data storage system 12 may include any one or more different types of disk devices such as, for example, an ATA disk drive, FC disk drive, solid state drive (SSD), and the like. An SSD is a data storage device that uses solid-state memory to store persistent data. Thus, the storage system may be made up of physical devices with different physical and performance characteristics (e.g., types of physical devices, disk speed such as in RPMs), RAID levels and configurations, allocation of cache, processors used to service an I/O request, and the like.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes. It should be noted that this is just one example of a provisioned storage object and the techniques described herein apply equally to other storage objects including file systems.

The data storage system may be a single unitary data storage system, such as single data storage array, including two storage processors or compute processing units. Techniques herein may be more generally use in connection with any one or more data storage system each including a different number of storage processors than as illustrated herein. The data storage system 12 may be a data storage array, such as a VNX® data storage array by EMC Corporation of Hopkinton, Mass., including a plurality of data storage devices 17A-17N and two storage processors 114A, 114B. The storage processors 114A, 114B may include a central processing unit (CPU) and memory and ports (not shown) for communicating with one or more physical or virtual hosts 14A-14N. The storage processor may be communicatively coupled via a communication medium such as storage processor bus 19. The storage processor units may be included in the data storage system 12 for processing requests and commands. In connection with performing techniques herein, an embodiment of the data storage system may include multiple storage processors including more than two storage processors as described. The VNX® data storage system mentioned above may include two storage processors 114A, 114B for performing processing in connection with servicing requests. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system. Secondary storage system 25 and its plurality of data storages devices 27A-27N may be similarly arranged and configured.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
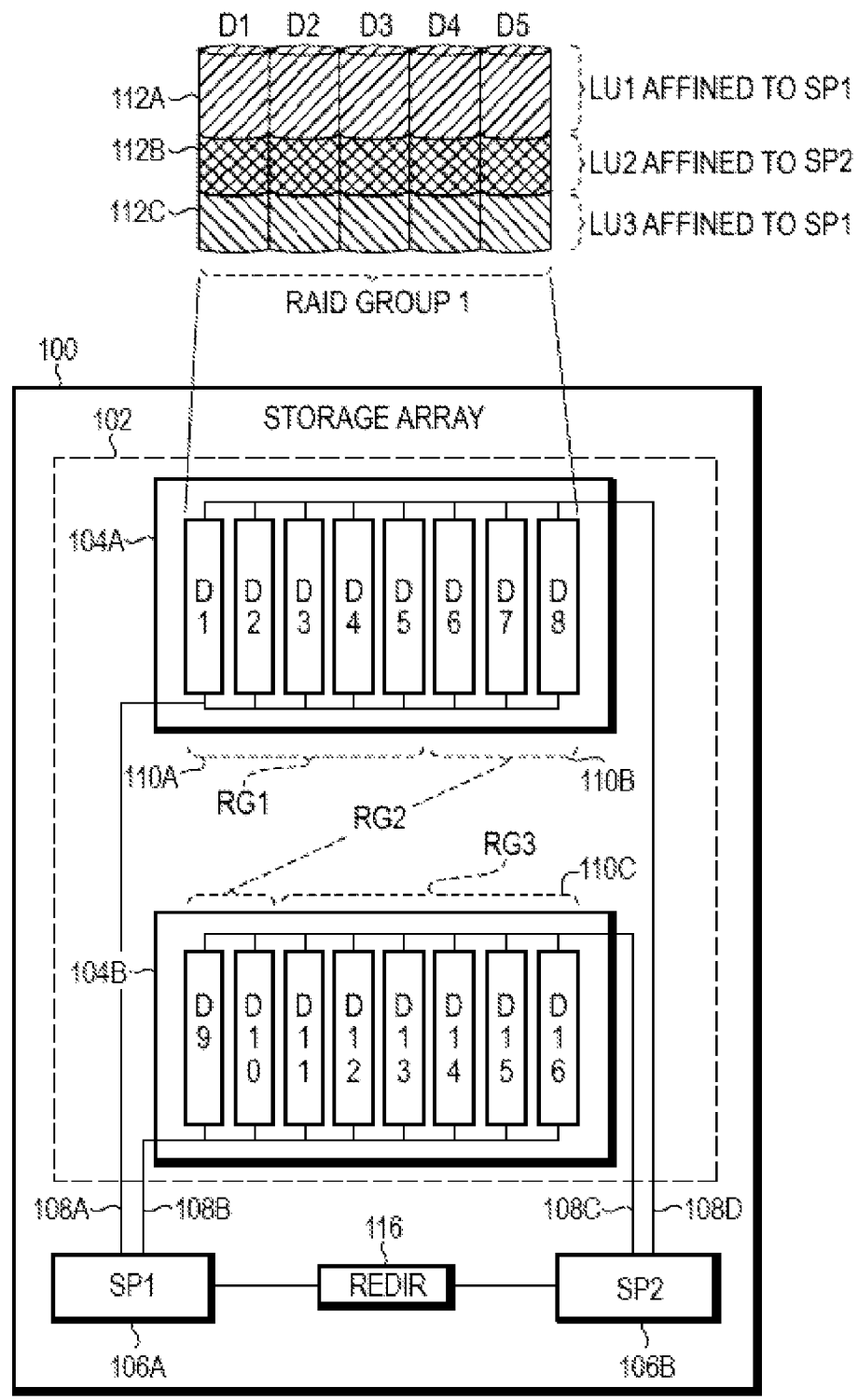
FIGS. 2-3 are block diagrams illustrating in more detail components of FIG. 1 that utilize the techniques described herein.
Figure 3:
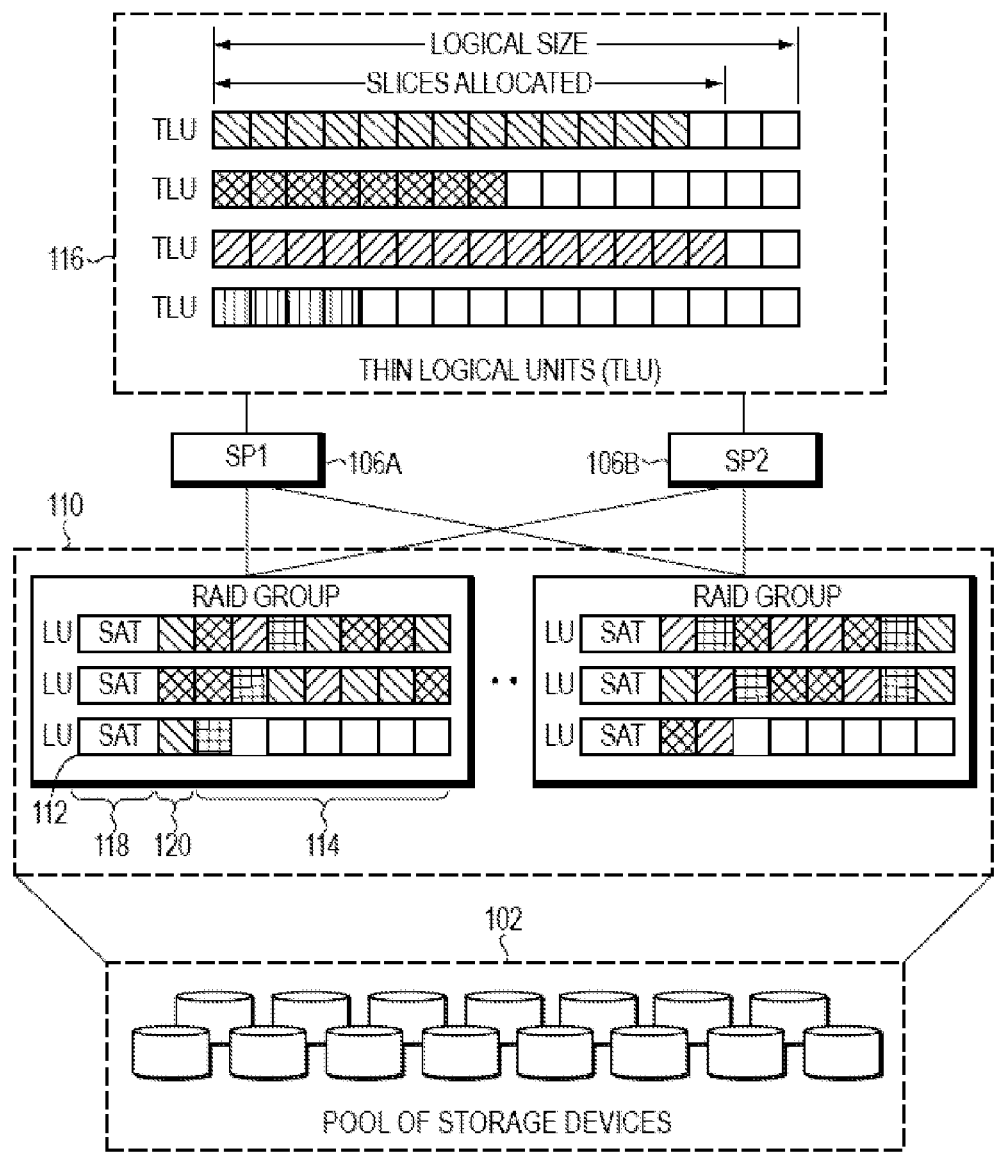

Referring to FIG. 2 and FIG. 3, shown are examples of an embodiment of a computer system that may be used in connection with performing the techniques described herein. FIG. 2 shows a storage system that comprises a storage array 12. Storage array 12 includes multiple storage devices 102, which are typically hard disk drives, but which may be tape drives, flash memory, flash drives, other solid state drives, or some combination of the above. Storage devices 102 may have various differences in capabilities based on physical characteristics of underlying storage media, e.g., flash memory may be extremely fast compared to tape storage which may be relatively large and cheap. As used herein, storage media may also be referred to as physical media. Storage media may include any of various computer readable media, e.g., hard disks, floppy disks, disks, tapes, discs, solid state memory, optical discs, and flash memory. In at least one embodiment, storage devices 102 may be organized into tiers or classes of storage based on characteristics of associated storage media. For example, flash-based storage device 102 may be tier 1 storage, hard disk-based storage device 102 may be tier 2 storage, and tape-based storage devices 102 may be tier 3 storage.

In at least one embodiment, the storage devices may be organized into multiple shelves 104, each shelf containing multiple devices 102. In the embodiment illustrated in FIG. 2, storage array 12 includes two shelves, Shelf1 104A and Shelf2 104B; Shelf1 104A contains eight storage devices, D1-D8, and Shelf2 also contains eight storage devices, D9-D16. Storage array 12 may include one or more storage processors 106, for handling input/output (I/O) requests and allocations. Each storage processor 106 may communicate with storage devices 102 through one or more data buses 108. In at least one embodiment, storage array 12 contains two storage processors, SP1 106A, and SP2 106B, and each storage processor 106 has a dedicated data bus 108 for each shelf 104. For example, SP1 106A is connected to each storage device 102 on Shelf1 104A via a first data bus 108A and to each storage device 102 on Shelf2 104B via a second data bus 108B. SP2 106 is connected to each storage device 102 on Shelf1 104A via a third data bus 108C and to each storage device 102 on Shelf2 104B via a fourth data bus 108D. In this manner, each device 102 is configured to be connected to two separate data buses 108, one to each storage processor 106. For example, storage devices D1-D8 may be connected to data buses 108A and 108C, while storage devices D9-D16 may be connected to data buses 108B and 108D. Thus, each device 102 is connected via some data bus to both SP1 106A and SP2 106B. The configuration of storage array 12, as illustrated in FIG. 2, is for illustrative purposes only, and is not considered a limitation of the current technique described herein.

In addition to the physical configuration, storage devices 102 may also be logically configured. For example, multiple storage devices 102 may be organized into redundant array of inexpensive disks (RAID) groups, or RGs 110, shown in FIG. 1A as RG1 110A, RG2 110B, and RG3 110C. Storage devices D1-D5 are organized into a first RAID group, RG1 110A, while storage devices D6-D10 are organized into a second RAID group, RG2 110B. Storage devices D11-D16 are organized into a third RAID group, RG3 110C. In at least one embodiment, a RAID group may span multiple shelves and/or multiple buses. For example, RG2 110B includes storage devices from both Shelf1 104A and Shelf2 104B.

Although RAID groups are composed of multiple storage devices, a RAID group may be conceptually treated as if it were a single storage device. As used herein, the term "storage entity" may refer to either a single storage device or a RAID group operating as a single storage device. RAID groups (RG) may be created or based on a various factors, including proximity of storage devices, utilization goals, capacity needs, physical characteristics of storage devices 102, and other factors. In at least one embodiment, RGs are based on tiers generally determined by physical characteristics of storage devices (e.g., fast, high quality devices D1-D5 may be tier 1 storage devices, and, as such, may be organized into a given RG 110). Such physical characteristics of storage devices for determining tiers may include but is not limited to capacity of storage device, access speed of storage device (e.g., revolution per minute (RPM) for disk-based media and throughput for solid state media), and type of storage device (e.g., flash, hard disk, and floppy). Further a RAID group may also include storage devices (e.g., disk drives) that are configured from different storage tiers.

In at least one embodiment, storage entities are associated with tiers or classes of storage. Storage entities may be further sub-divided into logical units. A single RAID group or individual storage device may contain one or more logical units. Each logical unit may be further subdivided into portions of a logical unit, referred to as "slices". As used herein, storage area refers to storage space of one or more storage entities in a storage system. Slices may be any size and may be associated with storage media from one or more storage entities. In at least one embodiment, slices are constant-sized portions of storage associated with one storage device 102, or a storage media therein, in storage array 12 (e.g., a 1 gigabyte (GB) slice from D2). In the embodiment illustrated in FIG. 2, RG1, which includes storage devices D1-D5, is sub-divided into 3 logical units, LU1 112A, LU2 112B, and LU3 112C. Each LU is sub-divided into multiple slices. Further, a user may not access LUs (LU1 112A, LU2 112B, and LU3 112C) as the LUs are referred to as private LUs. However, a user may access a mapped LU which is created from slices of private LUs as described below herein. A mapped LU may also be referred to as a front end logical unit such that a user may allocate the mapped LU for provisioning storage.

FIG. 3 is a block diagram illustrating another view of a data storage system for optimizing storage object location and relocation in a storage system according to an embodiment of the current technique described herein. In the simplified view shown in FIG. 3, a pool of storage devices 102 are organized into multiple RAID groups 110, and each RAID group is further divided into a number of LUs from which slices 114 are allocated to one or more mapped LUs for use by users of storage array 12. As used herein, a mapped LU refers to a logical portion of storage space that represent contiguous and/or non-contiguous physical storage space, where mapping allows for physical storage space to be dynamically linked together at a time of use into a logically contiguous address space. Exemplary examples of mapped LUs may include thin logical units (TLUs). A thin logical unit ("TLU") is a sparsely populated logical unit (LU) provisioned at creation but which is not allocated any storage until the storage is actually needed. TLUs 116 may have a logical size that is larger than the actual storage size consumed by TLUs 116. The actual consumed size is determined by the number of slices actually allocated to the TLU 116. Thus, an amount of storage space presented to a host of a data storage system using a thin logical volume may be different than the amount of storage space actually allocated to the thin logical volume. The slices that are allocated to a mapped LUN may be physically located anywhere in storage array 100. As will be discussed in more detail below, these slices may be located more or less contiguously, but they may also be distributed more or less evenly across all physical resources, depending on the slice selection and allocation policy or algorithm. Other physical distributions are within the scope of the current technique claimed herein.

In at least one embodiment, storage processors 106A, 106B are responsible for allocating storage and maintaining information about how that allocated storage is being used. In one implementation of storage array 100, each logical unit 112 is associated with a slice allocation table (SAT) 118, which is used to record information about each slice 114, such as the TLU that is using the slice 114 and whether the slice is free or allocated. The SAT 118 may be stored in the logical unit 112, or it may be stored outside the logical unit 112 to which it is associated.

Figure 4:
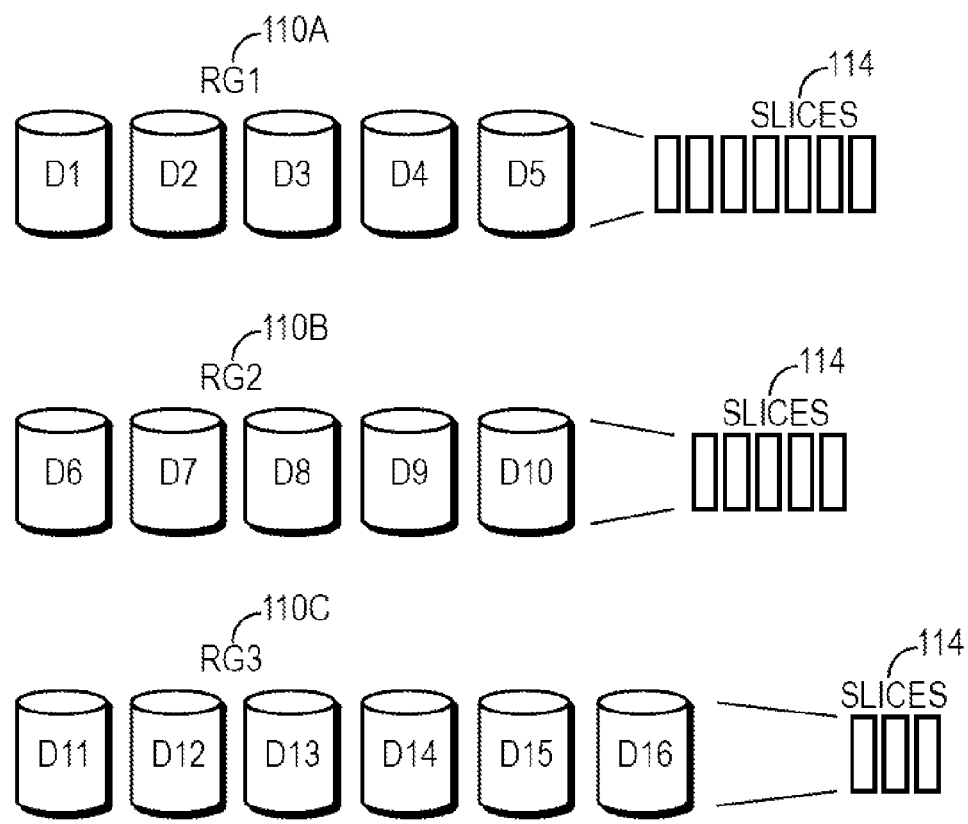
FIGS. 4-5 are examples illustrating storage device layout and data stored thereon.

Referring to FIG. 4, shown is a diagram illustrating an exemplary logical division of a storage of a data storage system into storage objects (such as RAID groups) for managing data relocation in the data storage system that may be included in an embodiment using the techniques described herein. With reference also to FIGS. 2 and 3, for example, storage entities 102 may refer to either a single storage device or a RAID group operating as a single storage device, may be further sub-divided into logical units. A single RAID group or individual storage device may contain one or more logical units (LUs) 112. However, RAID groups need not correspond to LUs and RAID groupings may be further divided into two or more LUs. In addition to RAID groups, each logical unit 112 may be further subdivided into portions of a logical unit, referred to as "slices" 114. Slices 114 may be allocated, de-allocated, re-allocated, reserved, or redistributed by a slice manger. A slice may be, for example, a 1 GB slice of data. However, it should be noted that a slice may be any other size as well, such as 256 megabytes (MB). Further, the techniques described herein should not be construed as being limited to only slices of data; the techniques are equally applicable to other data chunk sizes, such as blocks, slivers (subset of slices), page, file or the like. The slice manager may be a software application or layer that is executed, at least in part, by one or more SPs 106. The slice manager may be responsible for implementing a slice allocation policy and/or algorithm. For example, the slice manager may receive slice allocation requests, and maintain relevant statistical information regarding slices.

Figure 5:
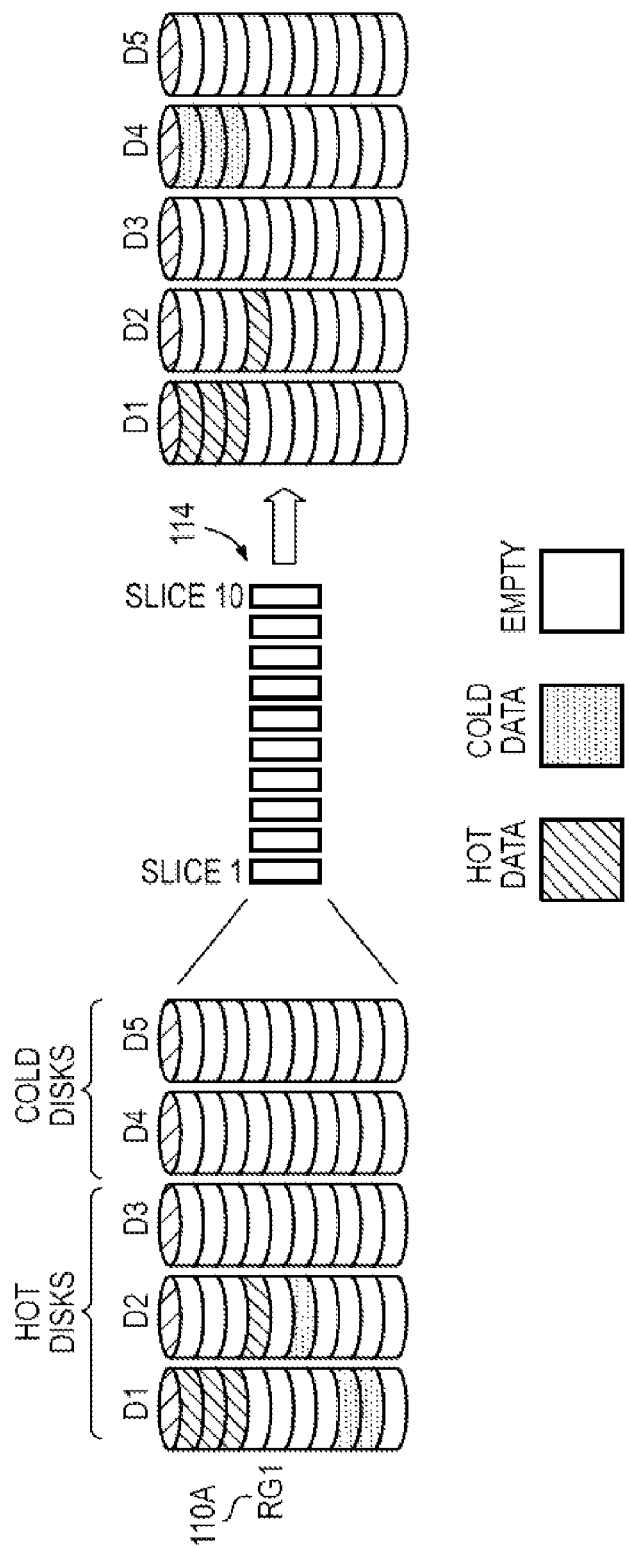

Referring to FIG. 5, shown is a diagram illustrating another example of logical division of a storage of a data storage system into storage objects (such as RAID groups, storage devices, slices) for managing data relocation in the data storage system that may be included in an embodiment using the techniques described herein. In at least one embodiment, a collection of hard disk drives may be organized into RAID arrays. The collective data storage capacity of storage devices (e.g., RG1 110A) is represented by data storage space. The data storage space may be divided into portions, hereinafter referred to as slices 114 (e.g., SLICE1-SLICE10). In at least one embodiment of the current technique, for example, each slice 114 is approximately 1 gigabyte (GB) in size, but other sizes may be used. Slices 114 within the data storage space may be organized into logical units (LUs), which are commonly referred to as LUNs.

In at least one embodiment of the current technique, data storage systems that comprise storage devices of varied performance characteristics grouped into tiers can be managed in such a way as to migrate data from one portion of the storage pool to another portion of the storage pool. A particular embodiment may help achieve this migration by automatically migrating data among the tiers based on the "temperature" of contents of a slice and location of the slice on storage devices. In general, temperature may correspond to, for example, how often and how recently the data is accessed. For example, hot data may refer to data that has been accessed recently and is accessed often, cold data may refer to data that has not been accessed recently and is not accessed often. Data temperature may be further segmented to include a warm data category that may include data that is less hot than hot data and/or less cold than cold data. Further, the temperature of a slice may be further adjusted based on the type of the slice indicating whether the slice stores data or metadata. Hence, warm data may refer to data that is accessed more often than cold data and less often that hot data. In general, in accordance with an embodiment of the current technique, hot data is migrated to faster (and typically more expensive) storage, and cold data is migrated to slower (and typically less expensive) storage. Warm data may be migrated to either type of storage and such storage may be configurable to be placed in a reduced power consumption state. Migration maybe accomplished by copying the data and changing the map entries for the logical addressed that were involved to reflect the new logical to physical association. Thus, hot data may be stored in disk drives indicated as hot disks and cold data may be stored in disk drives indicated as cold disks.

Additional details regarding slice relocation and tiered data storage arrays are disclosed in U.S. patent application Ser. No. 12/826,434, filed on Jun. 29, 2010 and entitled, "MANAGING MULTI-TIERED STORAGE POOL PROVISIONING" and U.S. patent application Ser. No. 12/824,816, filed on Jun. 28, 2010 and entitled, "METHODS, SYSTEMS, AND COMPUTER READABLE MEDIUM FOR TIER-BASED DATA STORAGE RESOURCE ALLOCATION AND DATA RELOCATION IN A DATA STORAGE ARRAY" which are incorporated by reference herein in their entireties.

Figure 6:
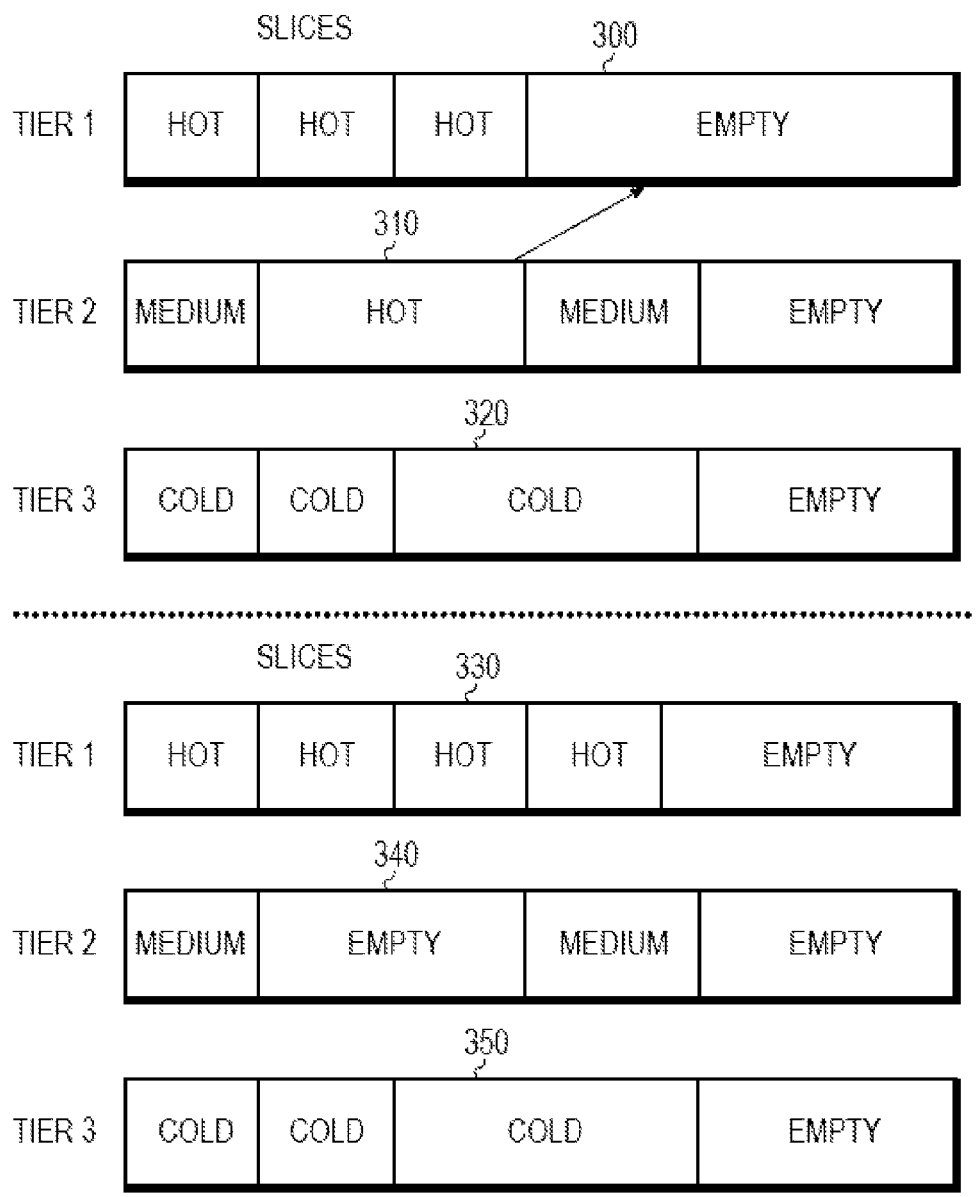
FIGS. 6-7 are diagrams illustrating storage tiers that may utilize the techniques described herein.

Referring now to FIG. 6 that illustrates a process of relocating slices from a first storage tier of a storage pool to a second storage tier of the storage pool in a data storage system. In FIG. 6, there are three storage tiers, Tier 1, Tier 2 and Tier 3. Each storage tier includes slices, such as slices 300, 310, and 320. As well, each slice has a temperature associated with it such as hot, cold, or medium. As well, some of the storage tier is also considered empty. Referring to the upper portion of the FIG. 6, there is a hot slice 310 in storage Tier 2. The temperature of a slice may be designated as a scalar or step value that is it may have a numerical equivalent such as 30 degrees or may simply be designated into a bucket, such as cold.

Also shown in the FIG. 6 is that Tier 1 has empty space 300. In this example, Tier 1 may have faster performance characteristics and a higher cost. Conversely, Tier 2 may have slower performance characteristics but a lower cost. This may be seen, for example, in the fact that there is more storage in Tier 2 than there is in Tier 1. Again, in the upper portion of the FIG. 6, it is shown that there is a hot slice 310 in Tier 2 that should be moved to Tier 1. In this example embodiment, as shown in the lower portion of FIG. 6, the hot slice is moved to Tier 1 leaving an empty space 340 in Tier 2.

Figure 7:
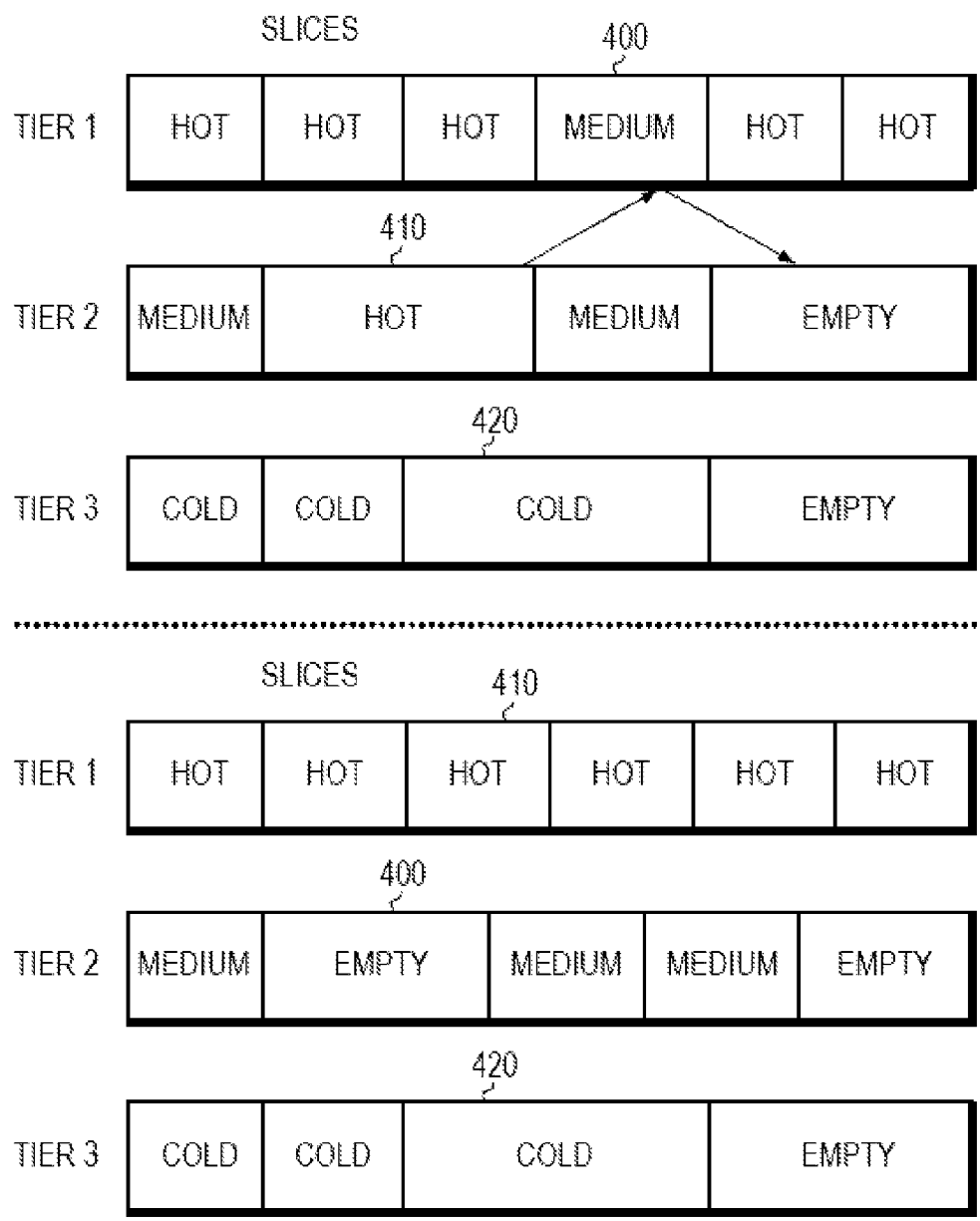

Referring now to FIG. 7 that illustrates a process of relocating slices from a first storage tier of a storage pool to a second storage tier of the storage pool in a data storage system. In this embodiment, there is a hot slice 410 in Tier 2 and a medium slice 400 in Tier 1; however, Tier 1 has no space to accommodate an additional tier. Therefore, in this embodiment, the medium slice 400 on Tier 1 is migrated to Tier 2 and the hot slice 410 in Tier 2 is migrated to Tier 1. Note, that it was the need to migrate the hot slice 410 to Tier 1 that caused the medium slice 400 to be shifted to Tier 2. In this example, it may have been more effective to have the medium slice located in Tier 1. Also note that slices may change temperature based on data access requests. Therefore, a slice's temperature may rise or fall over time. The slice's temperature may be the result of any number of calculations based on data access or data write requests to that slice.

Figure 8:
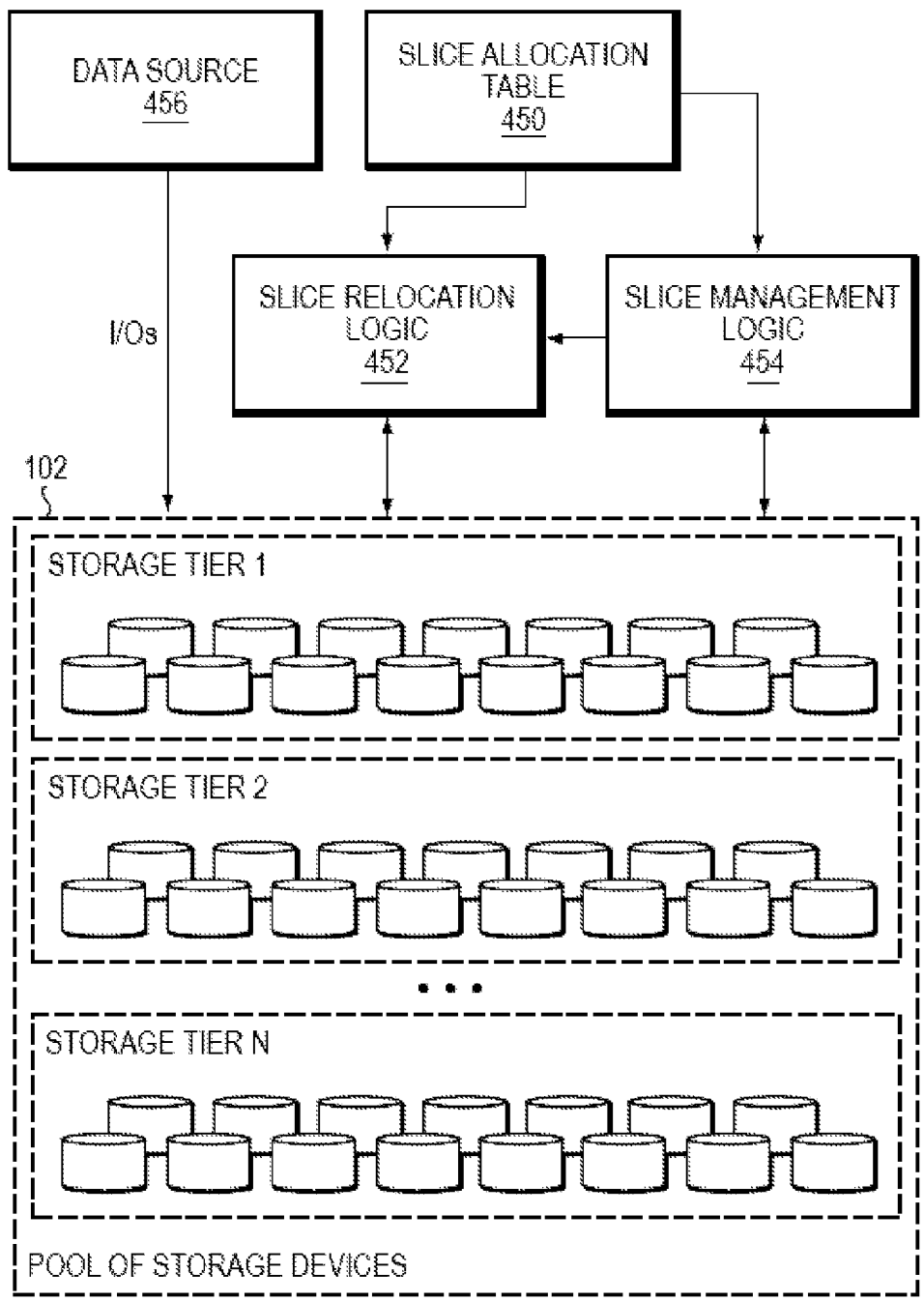
FIGS. 8-9 are a block diagrams illustrating in more detail components that may be used in connection with techniques described herein.

Referring to FIG. 8, shown is a more detailed representation of components that may be included in an embodiment using the techniques described herein. In at least some embodiments of the current technique, a storage pool may include one or more RAID groups. A RAID group may be associated with data devices, such as the physical devices 60a-60b discussed herein, so that, for example, there is one or more data devices for each RAID group, any portion of a data device for any portion of the pools of storage, and/or any combinations thereof. Further, data devices associated with a storage pool may have different characteristics, such as speed, cost, reliability, availability, security and/or other characteristics. Further, storage pool 102 may include one or more storage tiers such that each storage tier has different performance characteristics.

Slice relocation logic 452 may shift hot slices of a logical volume to upper tiers and cold slices of the logical volume down to lower tiers. The goal of the slice relocation process is to put hot, frequently accessed slices to higher tiers and maximize the utilization of these high tiers, which include faster but more expensive drives such as a flash storage drives. Slice relocation logic 452 relocates a slice based on the temperature of the slice. The temperature of a slice is determined based on I/O activity directed to the slice. I/O activity of a slice is an indicator of current I/O load of the slice. Slice I/O activity is computed using raw slice statistics. The computation may be done in any of several different ways. The specific computation to use may depend on the system I/O traffic pattern. In at least some cases, the simplest and most straightforward calculation is to use total slice I/O counts as I/O activity, such that the slice I/O load is the moving average of slice I/O counts. Further, slice relocation logic 452 works in conjunction with slice allocation table 450 for relocating data from a set of slices to another portion of the storage pool.

The data source 456 sends I/O requests that may result in writing new data to storage pool 102 which requires slices to be allocated from an appropriate storage tier within the storage pool 102. Further, a storage tier from which slices are allocated for writing new data may also need to provide storage space for relocating a set of slices from another storage tier to the storage tier. In order to accommodate storage space for writing new data and relocation of slices, slice management logic 454 (also referred to herein as "Auto-Tiering policy engine" or "slice relocation process") evaluates storage utilization characteristics such as history of slice relocation and the rate at which I/O requests resulting into writing new data are received. Based on the evaluation, slice management logic 454 adjust storage space reserved in each storage tier of storage pool 102 to enable the data storage system to accommodate read or write I/O requests to relocate slices in the storage tier.

Slice relocation statistics and slice allocation rate may be determined before the slice relocation process starts an iteration that relocates a set of slices. Further, the rate at which slices are allocated may be determined based on storage space utilization of a storage tier and by comparing previous and current storage space utilizations where the previous storage space utilization indicates the amount of storage space that has been allocated during a previous iteration of the slice relocation process and the current storage space utilization indicates the amount of storage space that has been allocated during a current iteration of the slice relocation process. Further, metadata of each slice of a storage tier may be evaluated to determine whether each slice of the storage tier has been allocated for writing new data. Thus, based on the evaluation of metadata, storage space utilization of a storage tier may be determined. Further, the rate at which slices are allocated indicates the number of slices that has been allocated for writing new data during a specific period of time.

Figure 9:
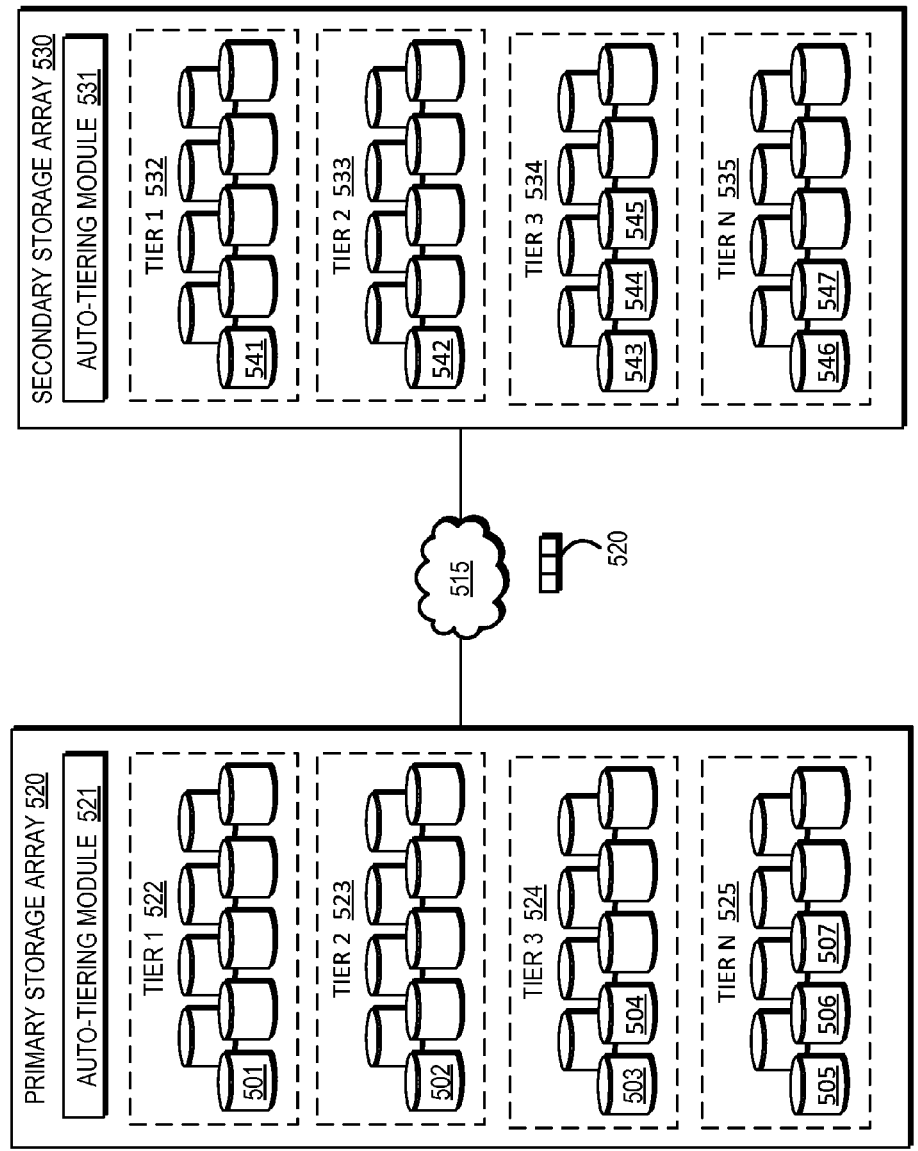

FIG. 9 is a block diagram illustrating use of multiple storage arrays 520, 530 connected via a network connection 515 and that may be part of a distributed/remote data replication system, for example, communicating as primary (also referred to as "production" and/or "local") and secondary (also referred to as "replication," "backup" and/or "remote") storage arrays, according to an embodiment of the system described herein. The storage arrays 520, 530 may each include auto-tiering modules 521, 531 that facilitate the location (also referred to as "relocation" or "placement") of data objects, such as the aforementioned slices, in a proper tier based on the data objects temperature and/or user preference. The auto-tiering modules 521, 531 may include or provide functionality similar to the slice allocation table 450, slice relocation logic 452 and slice management logic 454 as is described elsewhere herein. The storage arrays 520, 530 also include one or more storage devices, having components like that of the storage devices discussed elsewhere herein, and it should be noted that the storage arrays 520, 530 may not be identical and may have different configurations and/or capabilities. The primary storage array 520 may include one or more thin devices (not shown), as discussed elsewhere herein, coupled to multiple storage tiers 522 (TIER 1), 523 (TIER 2), 524 (TIER 3), 525 (TIER N) having different storage features and/or characteristics. The thin device may map to different storage areas (or devices) across the multiple storage tiers, as further discussed elsewhere herein. For example, in the illustrated embodiment, the thin device may map blocks of data to storage areas (or devices) such as a storage area 501 in the pool of storage of the top storage tier 522 (TIER 1), a storage area 502 in the pool of storage of the next storage tier 523 (TIER 2), storage areas 503, 504 in the pool of storage of the next storage tier 524 (TIER 3), and storage areas 505, 506 and 507 in the pool of storage of the next storage tier 525 (TIER N).

The auto-tiering module 521 in the primary storage array 520 may monitor and collect data temperature information concerning the data workload at the storage device 520 acting as the primary device in a manner similar as further discussed elsewhere herein. It should be noted that, in various embodiments, the auto-tiering module 521, 531 may be a software module or hardware circuitry stored on the storage array 520, 530 and/or may be located externally to the primary storage array 520 and coupled thereto, among other suitable configurations. The auto-tiering module 521 may generate, from the raw collected data temperature information, the temperature pattern information including characterizing statistics of data temperature and user preference data. The temperature pattern information may be smaller in size and/or contain less information than the raw collected data temperature information. The temperature and/or user preference information 520 may be transmitted to the secondary storage device 530 acting as the failover device for processing thereon. Such information 520 may be transmitted as metadata with, or separately from, the data it represents.

The secondary storage array 530 may include a thin device (not shown) coupled to multiple storage tiers 532 (TIER 1), 533 (TIER 2), 534 (TIER 3), 535 (TIER N) having different storage features and characteristics, as further discussed elsewhere herein. The thin device may map to different storage areas (or devices) across the multiple tiers. The secondary storage array 530 may be a backup or failover device by providing data replication, mirroring functionality or other such suitable disaster recovery functionality.

As described elsewhere herein, auto-tiering techniques may place data into a particular performance tier based on the data's temperature and user preference values. As a result, data that is read from very frequently or data that is written to very frequently will most likely be identified as hot data and will be promoted to a higher performance tier (e.g., TIER 1 522). In a similar manner, data that is read from or written to very infrequently will be identified as cold data and will be demoted to a lower performance tier (i.e., TIER 3 524). In this manner, the storage array 520 moves data to the most appropriate location based on access and preference so as to effectively provide faster processing and response time.

Disaster recovery techniques typically replicate data to a secondary storage array 530 by mirroring or sending time based snapshots or other such methods to the secondary storage array 530. In such cases, a host continues to access data on the primary storage array 520 and any data that changes since a previous update may be sent as replicated data to the secondary storage array 530 for backup/failover storage purposes. In the event of the failure, the primary storage array 520 can "failover" to a disaster recovery site (i.e., the secondary storage array 530).

As a result of the aforementioned data replication methods, data areas 541, 542, 543, 544, 545, 546, 547 in the secondary storage array 530 contain data corresponding to the data contained within the data areas 501-507 of the primary storage array 520. The corresponding data of the data areas 541-547 is associated with the data stored in the data areas 501-407 of the primary storage array 520 and, for example, may be an exact copy of the data stored in the data areas 501-407 of the primary storage array 520 and/or may be a somewhat earlier version of the data stored in the data areas 501-407 according to the frequency of data replication method in use.

The secondary storage system 530 may employ an auto-tiering module 531 to place data in tiers based on temperature and/or user preferences similar to the auto-tiering mechanism employed by the primary storage array 520. However, temperature of the data as stored on the secondary storage array 530 will not reflect the actual temperature values of the data as used by the primary storage array 520. Thus, the secondary storage array's auto-tiering activities will not accurately place data in an appropriate tier. For example, data that is read from very frequently on a primary storage array 520 will be identified as hot data and will be placed in tier 1 522. The same data on the secondary storage array will be stored thereon for backup purposes and since it has not changed, it will appear relatively inactive. As a result, what is hot data on the primary storage array 520 will appear to be cold data on the secondary storage array 530 and may be moved to a lower tier (e.g., TIER 3 534).

Similarly, the secondary storage array 530 is unable to determine the relative temperature values for different data slices. For example, between one snapshot update and the next, one data slice may be written to thousands of times and another data slice may be written to just once. However, when written to the secondary storage array 530, both slices will appear to have the same temperature when evaluated by its auto-tiering module 531 since both were written once during the replication. Because the secondary storage array 530 is unaware of such data activity patterns, it cannot use accurately place data in tiers corresponding to tiers where the data was located on the primary storage array 520. Furthermore, data may stay the same but can change temperature over the course of time, moving from cold to hot to medium one or more times. The secondary storage array 530 has no way to recognizing such temperature changes and, therefore, unable to appropriately promote/demote data to reflect such temperature changes.

In the event a failover situation occurs where the secondary storage array 530 is placed in production, data in the will not be in tiers corresponding the tiers as it was stored in the primary storage array 520, and, therefore, the system performance may suffer when failover occurs. The secondary storage array's 530 auto-tiering module 531 may eventually promote/demote data to the most appropriate tier at which point performance may be similar to the primary storage array 530 prior to failover. However, it can take days or weeks for all the data to be promoted/demoted to the correct tier (also referred to as 'warmed up').

In example embodiments of the techniques described herein, temperature data as determined on the primary storage array 520 is transmitted or otherwise communicated to the secondary storage array 530 as input to the secondary storage array's 530 auto-tiering module 531. In this way, the temperature data can more accurately reflect the data activity as exercised by the consumer of the data. Accordingly, the data in data areas 541-447 may be subject to auto-tiering according to the temperature pattern information received from the production device (i.e., primary storage array 520 in non-failover conditions) concerning actual I/O activity at the production device (the primary storage array 520). Thus, in one example embodiment, the auto-tiering module 531 receives the temperature and user preference information from the primary storage array 520 and controls the use of the temperature information for management of the replicated data on the secondary storage array 530.

In some embodiments, the secondary storage array 530 may have a different storage configuration than the primary storage array 520. In such cases, the result of auto-tiering the replicated data from the primary storage array 520 based on the temperature pattern information is illustrated as not being identical to the data tiering on the primary storage array 520. For example, the data of data area 505 on the primary storage array 520 is shown as being stored in the storage tier 525 (TIER N) of the primary storage array 520; however, the data of data area 545 on the secondary storage array 530 corresponding to the data of data area 505 is shown as being stored in the storage tier 534 (TIER 3) of the secondary storage array 530. That is, the data tiering on the secondary storage array 530 using the temperature pattern information has resulted in the storing of the data of data area 545 of the secondary storage array 530 on a different storage tier (storage TIER 534) than the equivalent storage tier (storage TIER 525) on the primary storage array 520 in accordance with the storage functionality of secondary storage array 530. It is noted, however, that in accordance with the system described herein, the data tiering on the secondary storage array 530 is such that the secondary storage array 530 is capable of quickly assuming the production workload that is currently being supported by the primary storage array 520. Accordingly, the temperature and user preference information transmitted to the secondary storage array 530 allows the secondary storage array 530 to make its own independent decisions on how best to utilize its available resources to match the performance requirements currently being supported by the primary storage array 520.

Figure 10:
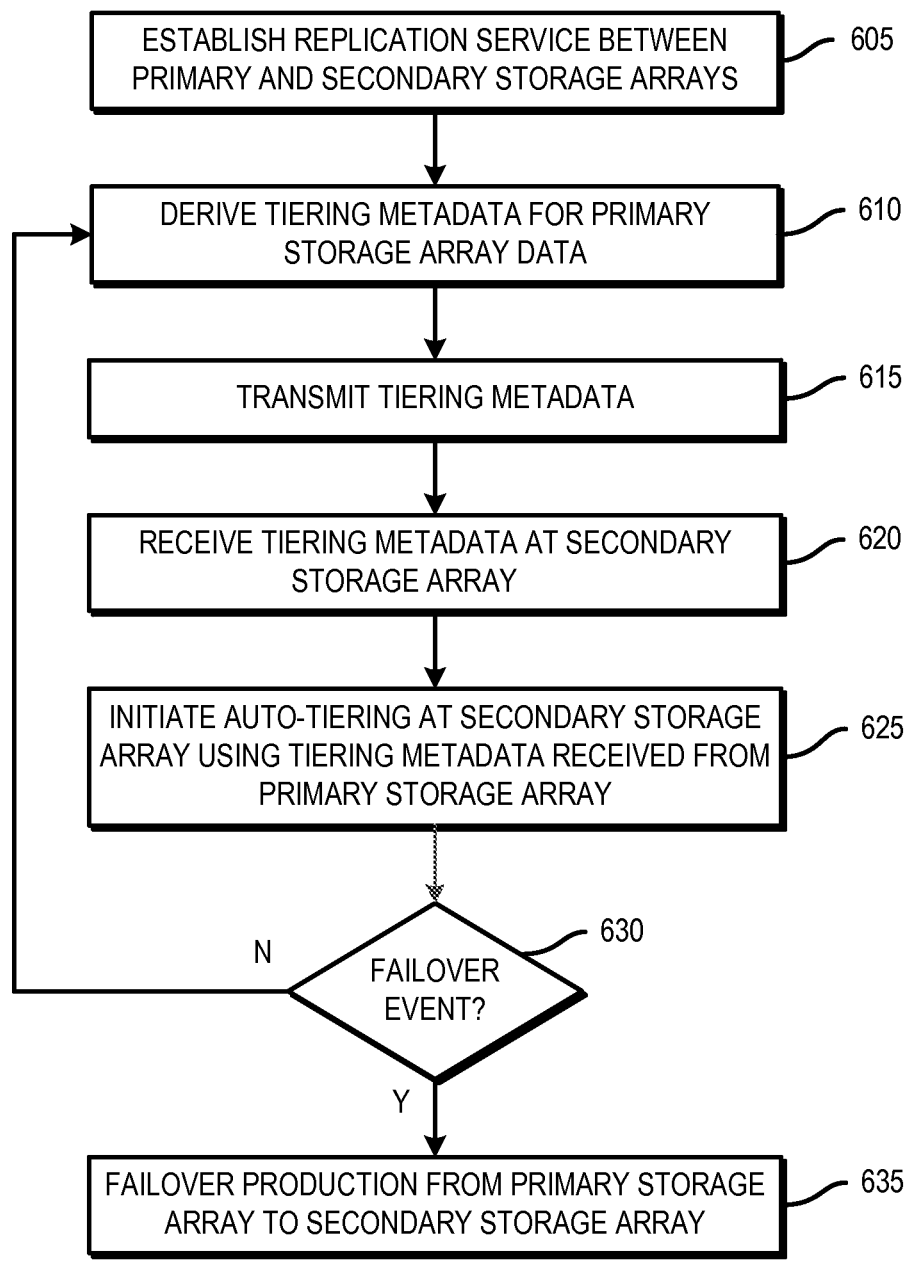
FIG. 10 is a flowchart of a method that may utilize the techniques described herein.

FIG. 10 is a flow diagram that illustrates an example method for optimizing data location in data storage arrays. While various methods disclosed herein are shown in relation to a flowchart or flowcharts, it should be noted that any ordering of method steps implied by such flowcharts or the description thereof is not to be construed as limiting the method to performing the steps in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

The method can be initiated automatically by storage management software and/or can be scheduled to run automatically at certain dates and times or based on one or more policies. Alternatively, the method can be initiated manually by a user, for example, by entering a command in a command-line-interface or by clicking on a button or other object in a graphical user interface (GUI). In one embodiment, at step 605, a primary storage array having an auto-tiering function or capability may be associated with a secondary storage array having similar auto-tiering function or capability, wherein the secondary storage array is configured as a backup storage array for the primary storage array. Although example embodiments describe techniques presented herein where production is set to run from a primary storage array and data stored thereon is backed up on a secondary storage array, this is for convenience and such examples should not be construed as a limitation as other production and production backup methods may be similarly employed. Further, the secondary storage array may provide multiple functions, such as providing backup services for one set of production data and providing primary production services for another user/host.

At step 610, tiering metadata for a storage object stored on the primary storage array may be derived. In one example embodiment, tiering metadata includes information associated with read and/or write I/O activity. Tiering metadata may include a data activity indicator for the storage object such as temperature data. User preference information indicating a specific tier a user would prefer the storage object be stored on may also be used. Such preference information can be used to override temperature information or used in conjunction with temperature when, for example, a user wants to ensure that particular data objects that may have an actual (i.e., calculated) temperature of medium or cold nevertheless be placed in a high tier typically reserved for hot data. Temperature data may be calculated using techniques described elsewhere herein, such as during or as a result of the auto-tiering function.

At step 615, the tiering metadata may be transmitted from the primary storage array to the secondary storage array. The tiering metadata may be transmitted on a periodic, aperiodic, event driven, user initiated or on-demand basis. At step 620, the tiering metadata is received at the secondary storage array.

At step 625, auto-tiering may be initiated at the secondary storage array, where the tiering metadata determined at the primary storage array is provided as input to the secondary storage array's auto-tiering function when the secondary storage array auto-tiers the replicated storage objects. Thus, the method applies the production data's tiering metadata to replicated data rather than using temperature calculations based on the activity as seen on the secondary storage array. As a result, replicated data stored on the secondary storage array may be stored in tiers having performance characteristics similar to the performance characteristics of the primary storage array's tiers where the source data (i.e., the data from which the replicated data was generated) is stored.

At step 630, if a failover event at the primary storage array is not identified, the method returns to step 610 where auto-tiering may be periodically or manually rerun. If a failover event is detected at step 630, the method proceeds to step 635 where a failover procedure is initiated for one or more production sites associated with the primary storage array such that production control is switched to the secondary storage array. Subsequent data tiering metadata may be derived based on an activity level of the storage object's activity level occurring at the secondary storage array after the failover for use as input to the secondary storage array's auto-tiering function for subsequent auto-tiering activity. As a result, when failover occurs, the performance of storage objects stored on the secondary storage array substantially equals performance of the storage objects stored on the primary storage array prior to initiating failover (assuming like storage tier configurations on the primary and secondary storage arrays).

Advantageously, in addition to providing a performance improvement upon failover, replication performance may also be improved employing techniques described herein. For example, storage objects that are frequently updated are typically located on a higher performing tier in the production primary storage array. The tiering metadata associated for these hot storage objects having been communicated to the secondary storage array result in the replicated storage object being located on a high tier thereon as well. As a result, replication performance at the secondary storage array may improve since frequently accessed data being frequently replicated will be on a higher performing tier at the secondary storage array. By contrast, with conventional systems such data would typically be placed on a lower performance tiers resulting in a slower response time where data is actually associated with high activity.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The block diagrams in the FIGs illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams illustration, and combinations of blocks in the block diagrams illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), Flash memory, an optical fiber, a portable compact disc read-only memory (CD-ROM), an optical storage device, digital versatile disc ROM (DVD-ROM) a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for optimizing location of storage objects in a storage array, the method comprising:
   associating a primary storage array with a secondary storage array, the primary storage array and secondary storage array including auto-tiering functionality, wherein the secondary storage array is configured as a backup storage array for the primary storage array;
   deriving tiering metadata for storage object stored on the primary storage array;
   transmitting the tiering metadata for the storage object to the secondary storage array;
   receiving, at the secondary storage array, tiering metadata derived at the primary storage array;
   initiating auto-tiering at the secondary storage array, wherein the received tiering metadata is provided as input to the auto-tiering function when auto-tiering replicated storage objects associated with the tiering metadata;

identifying a failover event at the primary storage array;

initiating failover for one or more production sites associated with the primary storage array from the primary storage array to the secondary storage array;

deriving subsequent data tiering metadata based on an activity level of the storage object activity occurring at the secondary storage array; and using the subsequent data tiering metadata as input to the secondary storage array's auto-tiering function.

2. The method of claim 1, wherein the tiering metadata includes temperature data associated with the storage object.

3. The method of claim 1, wherein the tiering metadata includes temperature data and user preference information associated with the storage object.

4. The method of claim 1, wherein deriving tiering metadata includes determining temperature data for the storage object, wherein the temperature data calculated as a function of the auto-tiering.

5. The method of claim 1, wherein the tiering metadata is transmitted from the primary storage array to the secondary storage array on a periodic, aperiodic, event driven, user initiated or on-demand basis.

6. The method of claim 1, wherein the auto-tiering functionality includes migrating high temperature storage objects to high performance tiers and low temperature storage objects to low performance tiers.

7. The method of claim 1, wherein storage objects stored on the secondary storage array are a copy of the storage objects stored on the primary array and, upon initiating failover, the performance of storage objects stored on the secondary storage array substantially equals performance of the storage objects stored on the primary storage array prior to initiating failover.

8. The method of claim 1, wherein replicated storage objects are stored on secondary storage array tier types that correspond to primary storage array tier types where the storage objects from which the replicated storage objects were replicated are stored.

9. The method of claim 1, wherein the tiering metadata includes information derived from read activity and write activity of the primary storage array storage object.

10. A system for optimizing location of storage objects in a storage array, the system configured to:
   a primary storage array associated with a secondary storage array, the primary storage array and secondary storage array including auto-tiering functionality, wherein the secondary storage array is configured as a backup storage array for the primary storage array;
   a first auto-tiering module configured to derive tiering metadata for a storage object stored on the primary storage array;
   transmit the tiering metadata for the multiple storage object to the secondary storage array;
   receive, at the secondary storage array, tiering metadata derived at the primary storage array;
   a second auto-tiering module configured to initiate auto-tiering at the secondary storage array, wherein the received tiering metadata is used as input to the auto-tiering function when auto-tiering replicated storage objects associated with the tiering metadata;
   identify a failover event at the primary storage array;
   initiate failover for one or more production sites associated with the primary storage array from the primary storage array to the secondary storage array;
   derive subsequent data tiering metadata based on an activity level of the storage object activity occurring at the secondary storage array; and
   provide the subsequent data tiering metadata as input to the secondary storage array's auto-tiering function.

11. The system of claim 10, wherein the tiering metadata includes temperature data associated with the storage object.

12. The system of claim 10, wherein the tiering metadata includes temperature data and user preference information associated with the storage object.

13. The system of claim 10, wherein derive tiering metadata includes determining temperature data for the storage object, wherein the temperature data calculated as a function of the auto-tiering.

14. The system of claim 10, wherein the tiering metadata is transmitted from the primary storage array to the secondary storage array on a periodic, aperiodic, event driven, user initiated or on-demand basis.

15. The system of claim 10, wherein the auto-tiering module initiates migration of high temperature storage objects to high performance tiers and low temperature storage objects to low performance tiers.

16. The system of claim 10, wherein storage objects stored on the secondary storage array are a copy of the storage objects stored on the primary array and, upon initiating failover, the performance of storage objects stored on the secondary storage array substantially equals the performance of the storage objects stored on the primary storage array prior to initiating failover.

17. The system of claim 10, wherein replicated storage objects are stored on secondary storage array tier types that correspond to primary storage array tier types where the storage objects from which the replicated storage objects were replicated are stored.

18. The system of claim 10, wherein the tiering metadata includes information derived from read activity and write activity of the primary storage array storage object.

* * * * *